(12) United States Patent
Kumagai

(10) Patent No.: US 7,797,067 B2
(45) Date of Patent: Sep. 14, 2010

(54) PRODUCTION MANAGEMENT PROGRAM, PRODUCTION MANAGEMENT METHOD, AND PRODUCTION MANAGEMENT SYSTEM

(75) Inventor: Eiji Kumagai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 11/974,044

(22) Filed: Oct. 10, 2007

(65) Prior Publication Data

US 2008/0046106 A1 Feb. 21, 2008

Related U.S. Application Data

(63) Continuation of application No. PCT/JP2006/307675, filed on Apr. 11, 2006.

(30) Foreign Application Priority Data

Apr. 12, 2005 (JP) ............................. 2005-115140

(51) Int. Cl.
*G06F 19/00* (2006.01)
*G06Q 10/00* (2006.01)
(52) U.S. Cl. ..................... 700/96; 700/99; 705/28; 705/29
(58) Field of Classification Search ............ 700/96, 700/97, 99, 100, 106–108, 115; 705/22, 705/28, 29; 702/182, 187; 707/1, 3, 4, 10; 712/240
See application file for complete search history.

(56) References Cited

U.S. PATENT DOCUMENTS 6,061,697 A * 5/2000 Nakao ......................... 707/3
6,088,625 A * 7/2000 Kellstrom, Jr. .............. 700/97
7,337,029 B2 * 2/2008 Oyamada et al. ............ 700/97

FOREIGN PATENT DOCUMENTS

| JP | 04-242124 | 8/1992 |
|---|---|---|
| JP | 11-296208 | 10/1999 |
| JP | 2001-075629 | 3/2001 |
| JP | 2001-084020 | 3/2001 |
| JP | 2001-101277 | 4/2001 |
| JP | 2003-281120 | 10/2003 |
| JP | 2004-280675 | 10/2004 |

* cited by examiner

*Primary Examiner*—Charles R Kasenge
(74) *Attorney, Agent, or Firm*—Fujitsu Patent Center

(57) ABSTRACT

A computer-readable recording medium recording a production management program that causes a computer to execute: a first process, based on a component table in which a group of components constituting a product is defined and on production planning information of the product, determining component planning information including a required period and a required quantity of each of the components; a second process linking the component planning information relating to each of the components within a certain period to an actual use record and recording it as first history information; a third process calculating a difference in the first history information recorded in chronological order and recording it as second history information; and a fourth process converting the second history information into a markup language and storing it, and searching and displaying the second history information on the basis of a specific component and period designated from outside.

9 Claims, 15 Drawing Sheets

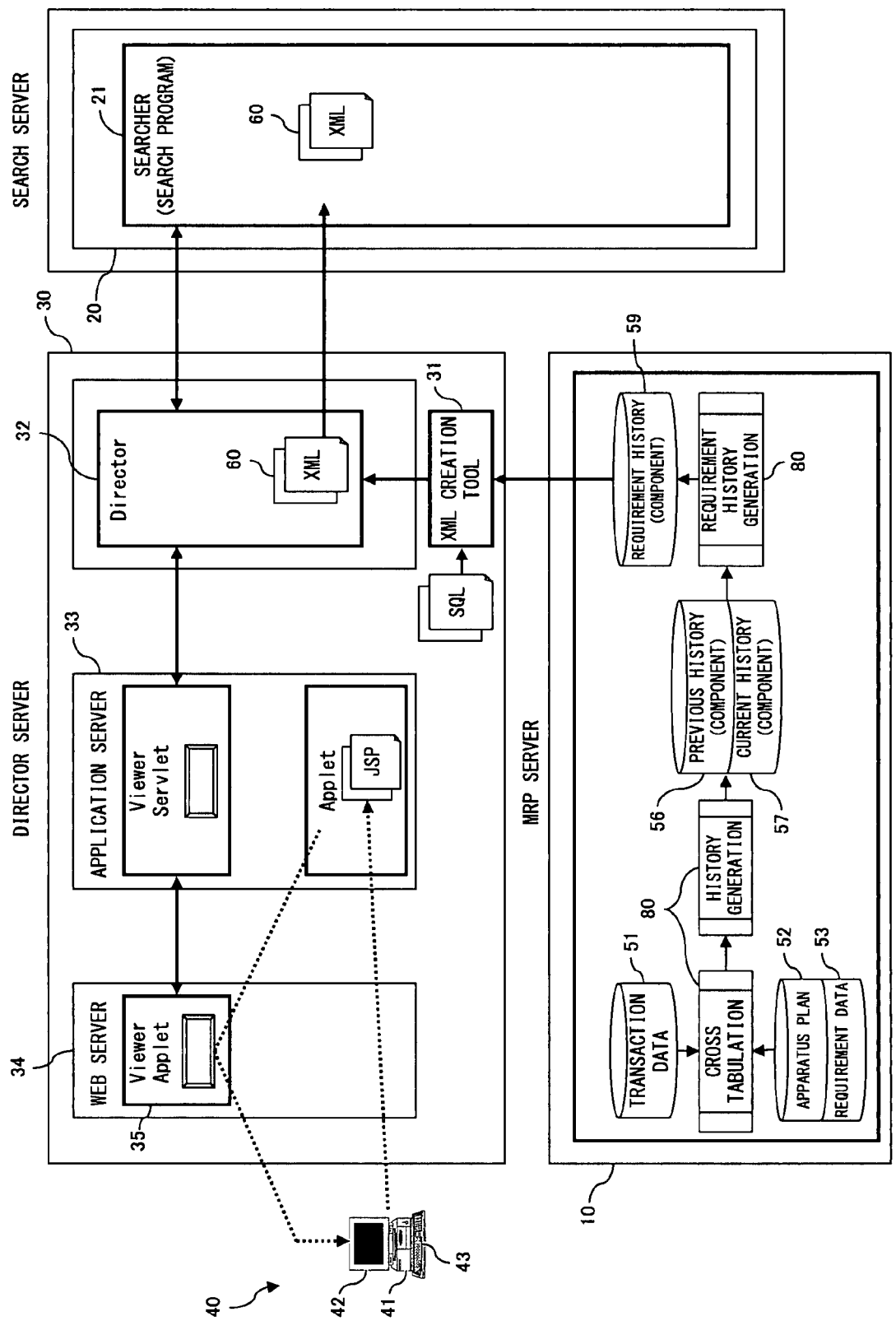
F I G. 1

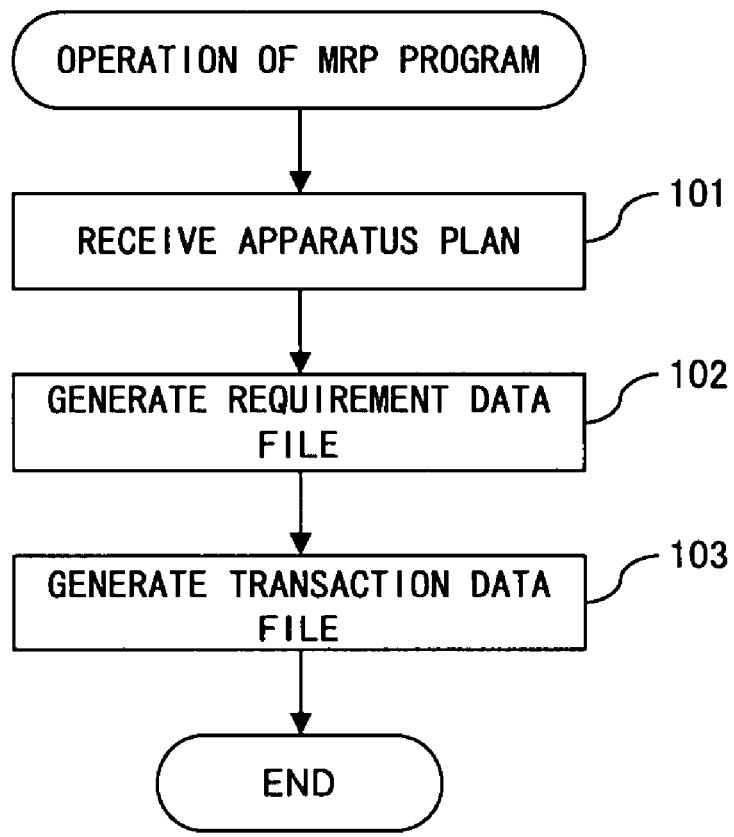
F I G. 3 A

FIG. 6A

REQUIREMENT HISTORY DATA (59)

| SUB-ITEM | PARENT ITEM | DATA CREATION DATE | JAN. 2003 | FEB. 2003 | .... | JAN. 2005 | FEB. 2005 | MAR. 2005 | .... |
|---|---|---|---|---|---|---|---|---|---|
| CA90001-08945 | PA03237-F004LL | 2005/1/14 | 12 | 0 | .... | 0 | 15 | 3 | .... |
| CA90001-13354 | PA03237-F004LL | 2005/1/14 | 0 | 0 | .... | 0 | 30 | 6 | .... |
| CA20004-B5617 | CA90001-08945 | 2005/1/14 | 0 | 0 | .... | 0 | 15 | 3 | .... |
| . . . | | | | | | | | | |
| SUB-ITEM | PARENT ITEM | DATA CREATION DATE | JAN. 2003 | FEB. 2003 | .... | JAN. 2005 | FEB. 2005 | MAR. 2005 | .... |
| CA90001-08945 | PA03237-F004LL | 2005/1/7 | 12 | 0 | .... | 0 | 12 | 1 | .... |
| CA90001-13354 | PA03237-F004LL | 2005/1/7 | 0 | 0 | .... | 0 | 30 | 6 | .... |
| CA20004-B5617 | CA90001-08945 | 2005/1/7 | 0 | 0 | .... | 0 | 15 | 3 | .... |
| . . . | | | | | | | | | |
| SUB-ITEM | PARENT ITEM | DATA CREATION DATE | JAN. 2003 | FEB. 2003 | .... | JAN. 2005 | FEB. 2005 | MAR. 2005 | .... |
| CA90001-08945 | PA03237-F004LL | 2005/1/1 | 12 | 0 | .... | 0 | 12 | 1 | .... |
| CA90001-13354 | PA03237-F004LL | 2005/1/1 | 0 | 0 | .... | 0 | 30 | 6 | .... |
| CA20004-B5617 | CA90001-08945 | 2005/1/1 | 0 | 0 | .... | 0 | 15 | 3 | .... |

(Data in past 2 years)

Additional columns (59e): JAN. 2003, FEB. 2003, ...., JAN. 2005, FEB. 2005, MAR. 2005, ....

Block 1: 0, 0, ...., 0, 3, 2, ....
         0, 0, ...., 0, 0, 0, ....
         0, 0, ...., 0, 0, 0, ....

Block 2: 0, 0, ...., 0, 3, 2, ....
         0, 0, ...., 0, 0, 0, ....
         0, 0, ...., 0, 0, 0, ....

Block 3: 0, 0, ...., 0, 0, 0, ....
         0, 0, ...., 0, 0, 0, ....
         0, 0, ...., 0, 0, 0, ....

XML FILE

```
<DOCUMENT>
  <ID>xml09021_FJIT</ID>
  <LINE>
  <ITEM>CA90001-08945</ITEM>
  <ITEM_OYA>PA03237-F004LL</ITEM_OYA>
  <DESCRIPTION_OYA>CAMPUS-03</DESCRIPTION_OYA>
  <AGC>MB</AGC>
  <KIKAKU> </KIKAKU>
  <VENDOR>SX</VENDOR>
  <PUR_LOC>23357</PUR_LOC>
  <FIX_LT>14</FIX_LT>
  <DTS_LT>0</DTS_LT>
  <ORD_QTY_MULT>2500</ORD_QTY_MULT>
  <KOBAI_TANTO>393791</KOBAI_TANTO>
  <KOTANTOMEIN>YOKOYAMA</KOTANTOMEIN>
  <WALTZ_KISHU>62</WALTZ_KISHU>
  <ITEM_COST>.84</ITEM_COST>
  <TEHAI_TANTO>840908</TEHAI_TANTO>
  <KOTEI_TANTO>772033</KOTEI_TANTO>
  <MIN_MAX_CONTROL> </MIN_MAX_CONTROL>
  <SAFE_LT>0</SAFE_LT>
  <SAFE_QTY>0</SAFE_QTY>
  <SAFE_BF_LT>0</SAFE_BF_LT>
  <GEN_TANI>336.2</GEN_TANI>
  <SEIZO_STP_FLG>1</SEIZO_STP_FLG>
  <OH_QTY>701</OH_QTY>
  <REQ_QTY>0</REQ_QTY>
  <SIKOMI_DATE>2005/02/04</SIKOMI_DATE>
  <SIKOMI_W>200506</SIKOMI_W>
  <MONTH01>12</MONTH01>
  <MONTH02>0</MONTH02>
  <MONTH03>0</MONTH03>
  <MONTH04>0</MONTH04>
  <MONTH05>0</MONTH05>
       .
       .
       .
```

FIG. 6B

EXCESS COMPONENTS ARE DETECTED

| SUB-ITEM | PARENT ITEM | PRODUCTION DATE | 2005/03 |
|---|---|---|---|
| CA01022-0429 | PA02014-D03600LA | 2005/01/21 | -44 |
| | PA02014-D03600LE | 2005/01/21 | -3 |

PRODUCTION MANAGEMENT PROGRAM, PRODUCTION MANAGEMENT METHOD, AND PRODUCTION MANAGEMENT SYSTEM

CROSS-REFERENCE TO RELATED APPLICATIONS

This application is a continuation of international PCT application No. PCT/JP2006/307675 filed on Apr. 11, 2006.

BACKGROUND OF THE INVENTION

1. Field of the Invention

The present invention relates to a production management technology, specifically to a technology that is effective when applied to excess inventory management, control and other such manipulation of components in production planning systems such as MRP (Material Resource Planning).

2. Description of the Related Art

In manufacturing processes of various products, the appropriate procurement of a variety of components that constitute the products is essential for the promotion of efficiency in the manufacturing processes.

For that reason, it is known that by employing an MRP technology such as that disclosed in Patent Document 1, a component procurement plan is prepared in line with the production plan of products, and the components can be distributed appropriately every week for example. It is also known that excess components are distributed to each of the manufacturing processes at the time of production plan preparation.

However, in actual manufacturing processes, various factors cause actual product quantities to vary from the product quantities specified during production plan preparation. For that reason, where the most suitable component distribution is performed on the basis of MRP every week, if excess components are produced within the period between production plan preparation and preparation of the next production plan and those components are of no use, the components become excess inventory.

In MRP, additionally, although the weekly most suitable result is output, factors causing the excess inventory are not considered at all. If a large number of components are used in every product and there is a deep hierarchical structure of inter-component dependency, appropriate control of such components of no use would not be feasible.

One possible solution to prevent the excess inventory of components is to prepare, for example, a daily or hourly production plan, which is a shorter time period than a weekly production plan; however, this is impossible in practice because the amount of information and calculation required for such production plan preparation is huge, and the procurement of components is quite complicated.

In the existing production management system in particular, a manager has to place orders for components trusting the production plan that is updated every week by MRP, and in cases such as when there is a large variety of components, a lengthy hierarchy of BOM (bills of material), and many common components, tracing the factor causing the excess components can be difficult if the excess components are included in the inventory assets, and making the decision of whether to hold or discard the components requires some time.

Patent Document 1 discloses a technology for pursuing a low cost and real-time production management system by constantly generating expansion constitution information that is the expansion of required quantities of each article number for each instructed article number, on the basis of component information representing information of a single article number, component table information representing the relationship between article numbers, and application information representing alterations in article numbers to be applied to a product.

Patent Document 2 discloses a technology for efficiently managing a design process for preparing the technical information of a drawing and the like by displaying the issue result of a drawing as a progress picture for each kind of machine of the product in accordance with a drawing issue plan set so as to procure parts on the basis of a production plan.

However, neither Patent Document 1 nor Patent Document 2 discloses the displaying of information required for analyzing the factors that caused the excess inventory of components.

Patent Document 1:
  Japanese Patent Application Publication No. 2001-75629
Patent Document 2:
  Japanese Patent Application Publication No. 2001-84020

SUMMARY OF THE INVENTION

It is an object of the present invention to provide a production management technology that enables appropriate management of the factors and history of excess inventory of components constituting a product.

It is another object of the present invention to provide a production management technology that enables prompt and appropriate implementation of control of component excess inventory created in the production planning system.

It is a first aspect of the present invention to provide a production management program causing a computer to execute a first process, based on a component table in which a group of components constituting a product is defined and on production planning information of the product, determining component planning information including a required period and a required quantity of each of the components, a second process linking the component planning information relating to each of the components within a certain period to an actual use record and recording this as first history information, a third process calculating a difference in the first history information recorded in chronological order and recording this as second history information, and a fourth process converting the second history information into a markup language and storing it, and searching and displaying the second history information on the basis of a specific component and period designated from outside.

It is a second aspect of the present invention to provide a production management method comprising a first process, based on a component table in which a group of components constituting a product is defined and on production planning information of the product, determining component planning information including a required period and a required quantity of each of the components, a second process linking the component planning information relating to each of the components within a certain period to actual use records and recording this as first history information, a third process calculating a difference in the first history information recorded in chronological order and recording it as second history information, and a fourth process converting the second history information into a markup language and storing it, and searching and displaying the second history information on the basis of a specific component and period designated from outside.

It is a third aspect of the present invention to provide a production management system having a control logic comprising storing means for storing a component table in which a group of components constituting a product is defined and production planning information of the product, a first function for determining component planning information including a required period and a required quantity of each of the components on the basis of the component table and the production planning information, a second function for linking the component planning information relating to each of the components within a certain period to actual use records and recording it as first history information in the storing means, a third function for calculating a difference in the first history information recorded in chronological order and recording it as second history information in the storing means, and a fourth function for converting the second history information into a markup language and storing it, and searching and displaying the second history information on the basis of a specific component and period designated from outside.

It is a fourth aspect of the present invention to provide a production management program causing a computer to execute processing of displaying information for specifying a cause of excess inventory of a component using second history information obtained as a difference that has occurred over time in first history information recorded by linking component plan information containing the required time period and required quantity of a component to actual use records of the component within a prescribed time period.

The present invention described above, when excess inventory of a component is found, can extract the history of fluctuations in the required quantity of the component from the second history information recorded periodically on the basis of the identification information of the component, and display fluctuations of the required quantity of the components; that is, display information for specifying a product that causes the excess inventory. In other words, it is possible to specify the point in time at which and the product plan under which the excess inventory component is ordered. In addition, it is possible to trace the point in time when a product plan is decreased or the product plan disappears and to trace the decreased or disappeared product plan.

By setting an appropriate threshold to the quantity of the excess inventory components and automatically extracting and displaying the excess inventory components that exceeded the threshold from the second history information recorded periodically, it is also possible to warn an administrator of the production management system about the creation of excess inventory.

As a result, the production management system administrator can make an appropriate judgment of an excess component disposal method on the basis of, for example, the cause of the excess inventory of the specified component.

BRIEF DESCRIPTION OF THE DRAWINGS

FIG. 1 is a diagram showing a conception of an example of a production management system configuration that is one of embodiments of the present invention;

FIG. 3A is a flowchart showing an example of operations of the production management system that is one of embodiments of the present invention;

FIG. 6A is a diagram paired with FIG. 6B showing a conception of an example of the composition of and changes in various information files used in the production management system that is one of embodiments of the present invention;

FIG. 6B is a diagram paired with FIG. 6A showing a conception of an example of the composition of and changes in various information files used in the production management system that is one of embodiments of the present invention;

FIG. 10 is a diagram showing a conception of an example of an electronic mail sent to a system administrator from the production management system that is one of the embodiments of the present invention.

DESCRIPTION OF THE PREFERRED EMBODIMENTS

In the following description, details of the embodiments of the present invention are set forth with reference to the drawings.

Figure 2:
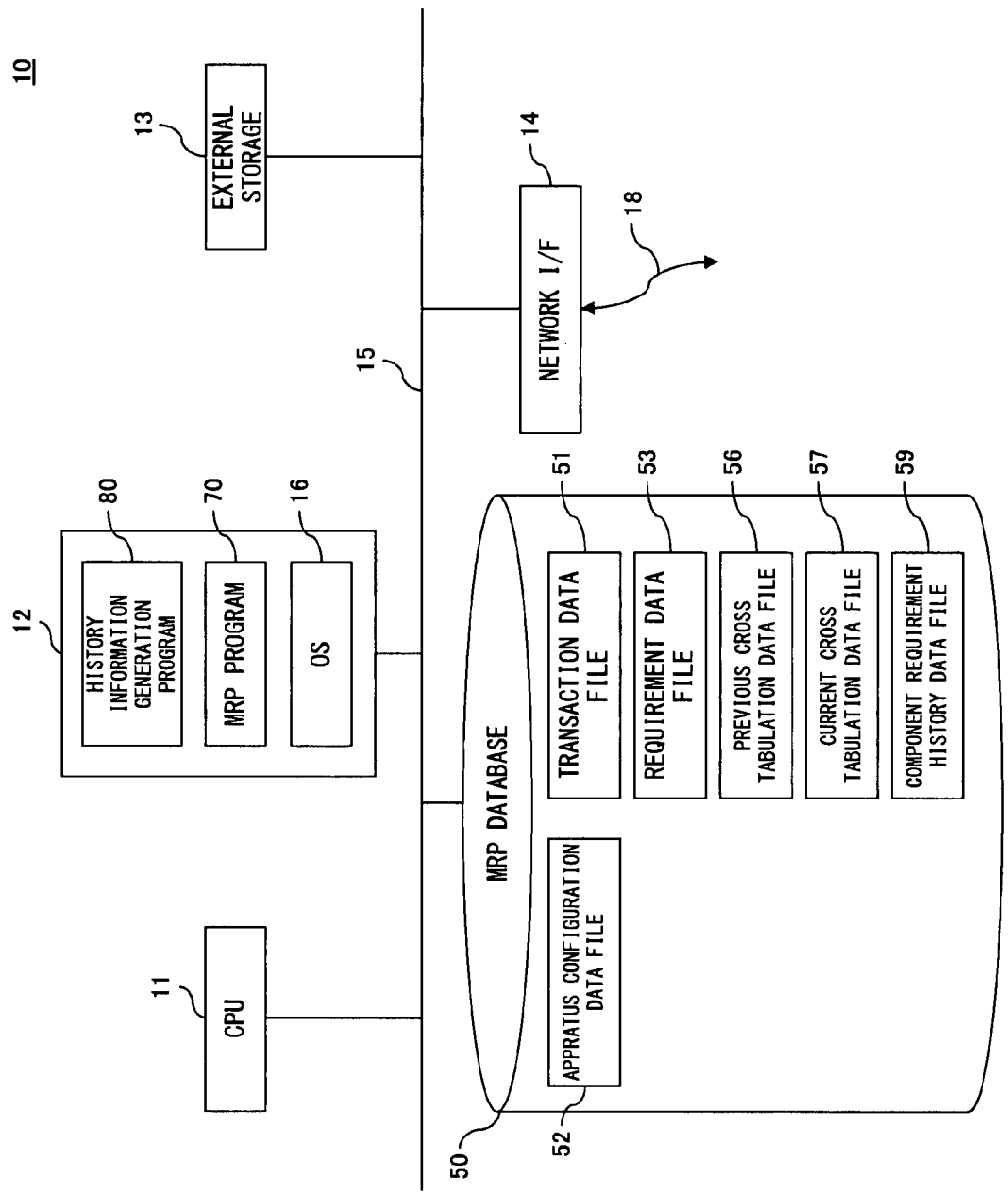
FIG. 2 is a diagram showing an example of an MRP server configuration constituting the production management system that is one of embodiments of the present invention.

FIG. 1 is a diagram showing a conception of an example of a production management system configuration that is one of the embodiments of the present invention, and FIG. 2 is a diagram showing an example of an MRP server configuration constituting the production management system of the present embodiment.

Additionally, FIG. 3A, FIG. 3B, FIG. 3C and FIG. 4 are flowcharts showing an example of operations of the production management system of the present embodiment. FIGS. 5A and 5B and FIGS. 6A and 6B are diagrams showing a conception of an example of the composition of and changes in various information files used in the production management system of the present embodiment.

The production management system of the present embodiment comprises an MRP server 10, a search server 20, a director server 30, a search terminal 40 and others, and these are connected to each other by an information network.

Note that in the following explanation, an example that implements the MRP server 10, the search server 20 and the director server 30 in a separate computer is described; however, any two of those or all three maybe comprised in a single computer system.

The MRP server 10 performs production plan preparation in manufacturing processes of a product. The search server 20 accumulates information which is output from the MRP server 10 in a text format such as XML (Extensible Markup Language), and executes search processing of necessary information. The director server 30 executes processing of relaying a search request from the search terminal 40 to the search server 20, and of responding the search result to the search terminal 40 in a text format such as XML.

As exemplified in FIG. 2, the MRP server 10 comprises a CPU (Central Processing Unit) 11, main memory 12, an external storage 13, a network interface 14, and an MRP database 50. These are connected to each other by a bus 15.

The CPU 11 controls the whole MRP server 10 by executing programs such as an operating system 16 stored in the main memory 12.

The main memory 12 stores programs and data executed by the CPU 11. In the case of the present embodiment, an MRP program 70 and a history information generation program 80 operating on the operating system 16 are stored.

The external storage 13 is a storage medium that realizes information-rewritable enduring storage of the information, and nonvolatile storage of information such as the operating system 16, the MRP program 70, and the history information generation program 80, and these pieces of information are loaded from the external storage 13 to the main memory 12 at the startup of the MRP server 10.

The network interface 14 controls information exchange with another director server 30 via an information network 18 such as a LAN.

The MRP database 50 comprises, for example, a transaction data file 51, an apparatus configuration file 52, a requirement data file 53, a previous component cross tabulation data file 56 (first history information), a current component cross tabulation data file 57 (first history information), and a component requirement history data file 59 (second history information).

Figure 5A:
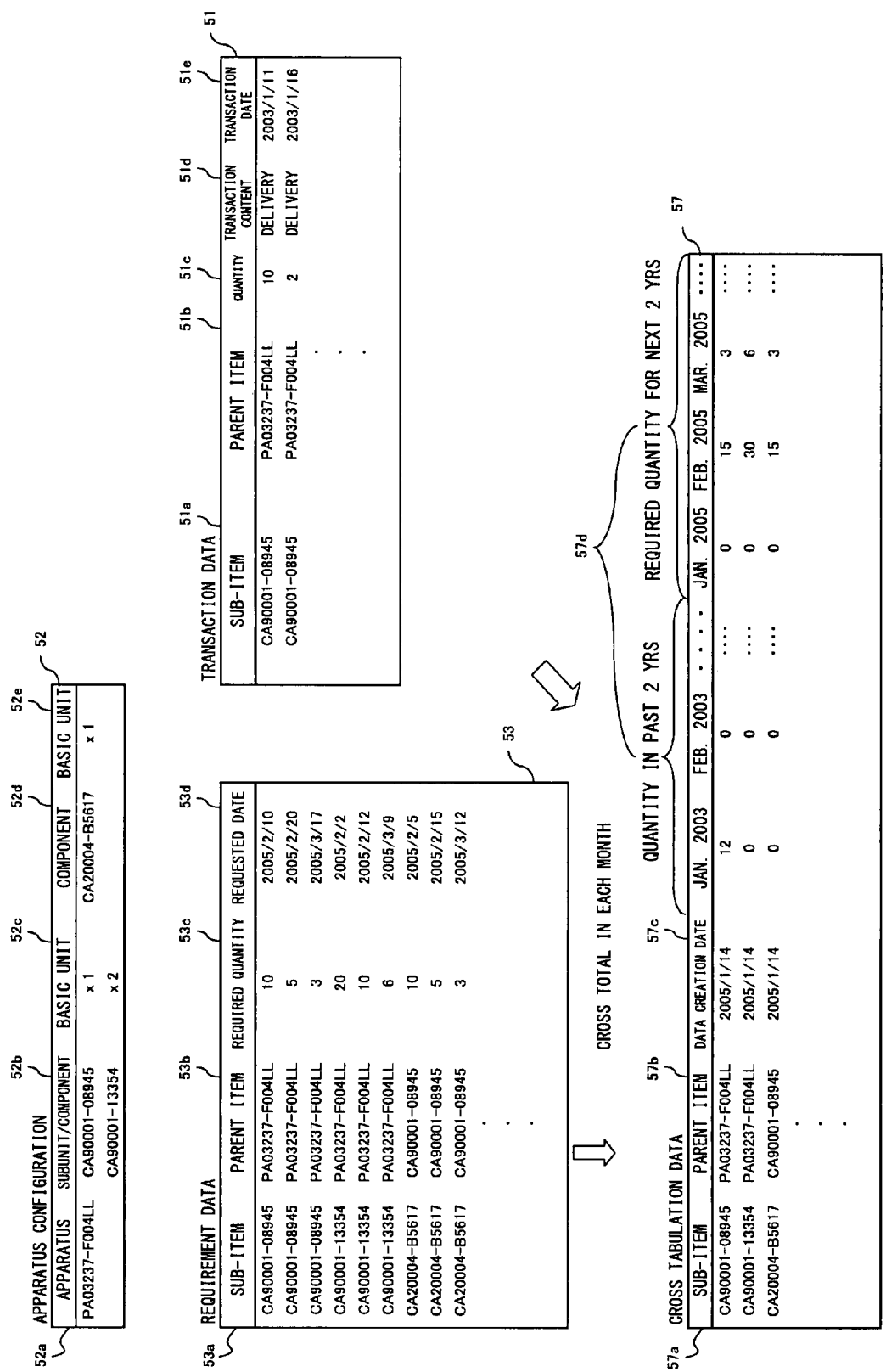
FIG. 5A is a diagram paired with FIG. 5B showing a conception of an example of the composition of and changes in various information files used in the production management system that is one of embodiments of the present invention.
Figure 5B:
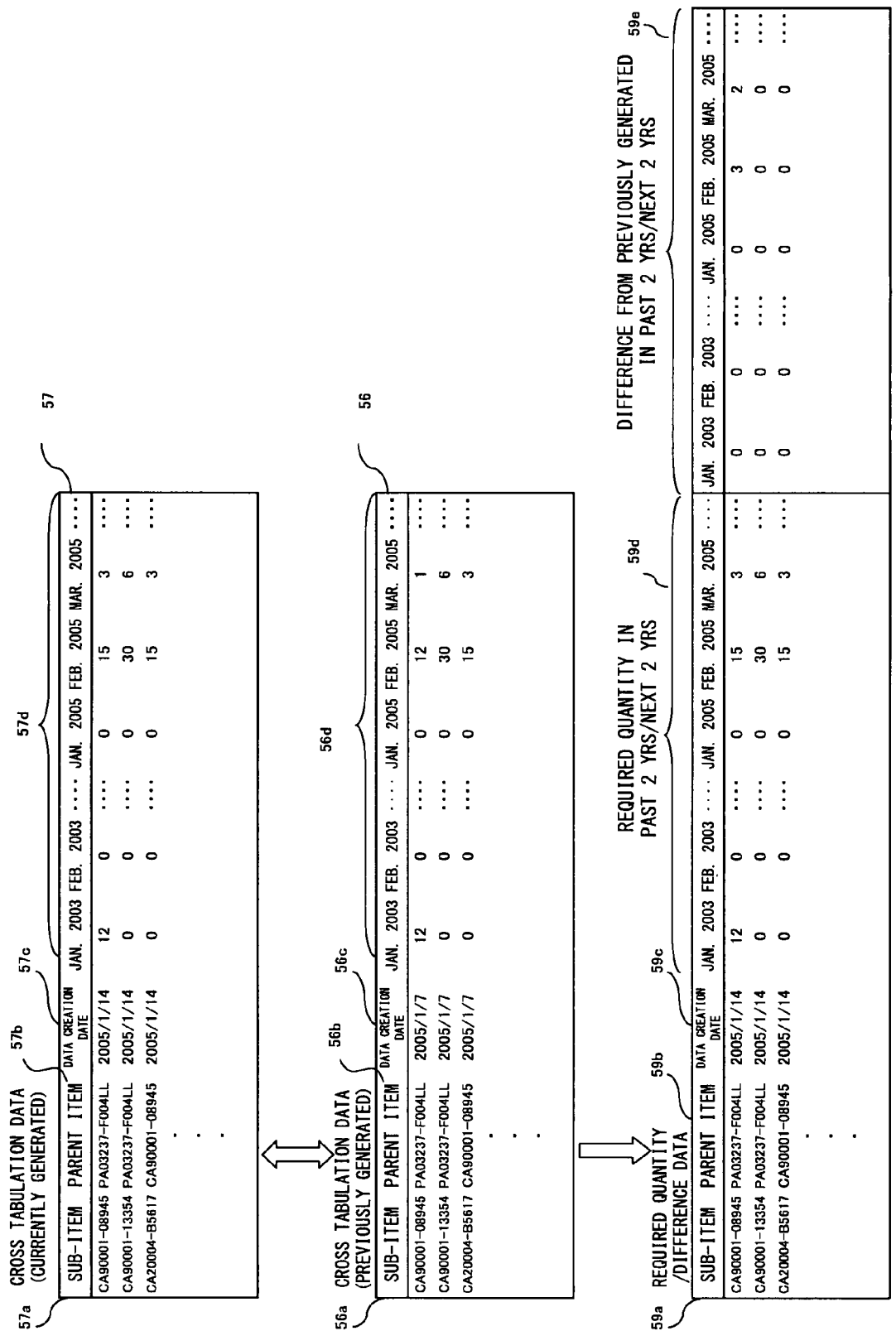
FIG. 5B is a diagram paired with FIG. 5A showing a conception of an example of the composition of and changes in various information files used in the production management system that is one of embodiments of the present invention.

As exemplified in FIG. 5A and FIG. 5B, in the apparatus configuration file 52, subunits and configurations and quantities of components that constitute the product apparatus which is to be a subject of the production management are defined. The apparatus configuration file 52 stores information of a subunit/component name 52b, a basic unit 52c, a component name 52d and a basic unit 52e, each of which corresponding to each apparatus name 52a.

The transaction data file 51 is a file for recording the purchase (use) record of a component constituting each product apparatus defined in the apparatus configuration file 52. A parent item 51b, a quantity 51c, a transaction content 51d, and a transaction date 51e corresponding to each sub-item 51a are stored in the transaction data file 51.

The sub-item 51a is identification information given to individual components. The parent item 51b is identification information of a subunit or the product apparatus using the component as a constituent. The transaction content 51d is identification of an inbound component or an outbound component (e.g. delivery=outbound component). The transaction date 51e is the date when the component is actually used (delivered).

The requirement data file 53 is a file that the MRP program 70 generates on the basis of the production plan (production deadline, product quantity) of the product apparatus and information of the apparatus configuration file 52. In the requirement data file 53, in order to carry through with the production plan of the product apparatus, information of the number of components required and a deadline is stored. Specifically, for each sub-item 53a given to individual components, a parent item 53b, required quantity 53c, and requested date 53d are stored in the requirement data file 53.

In the present embodiment, processing of comparing (cross tabulation) the requirement data file 53 in the production plan with the transaction data file 51 indicating the actual use record of components, generating the current component cross tabulation data file 57 and accumulating the files in chronological order, is carried out by the history information generation program 80.

The current component cross tabulation data file 57 is accumulated in chronological order, and the file recorded before the current component cross tabulation data file 57 is the previous component cross tabulation data file 56. The items in the previous component cross tabulation data file 56 are the same as those in the current component cross tabulation data file 57.

The current component cross tabulation data file 57 comprises a sub-item 57a, a parent item 57b, a data creation date 57c, and a required quantity in each period 57d.

The sub-item 57a is identification information given to the individual components. The parent item 57b is identification information of a subunit or the product apparatus using the component as a constituent. The data creation date 57c is the date when the cross tabulation is executed. The required quantity in each period 57d is a required quantity (use record) of the component tabulated at a prescribed period such as every day, every week, or every month.

Furthermore, in the present embodiment, the history information generation program 80 carries out processing of calculating the difference between the previous component cross tabulation data file 56 and the current component cross tabulation data file 57, and storing the difference in chronological order as a component requirement history data file 59.

The component requirement history data file 59 comprises a sub-item 59a, a parent item 59b, a data creation date 59c, a required quantity in each period 59d and a difference data 59e.

The sub-item 59a is identification information given to the individual components. The parent item 59b is identification information of a subunit or the product apparatus using the component as a constituent. The data creation date 59c is the date when the difference calculation processing is executed. The required quantity in each period 59d is a required quantity (use record) of the component tabulated at a prescribed period such as every day, every week, or every month. The difference data 59e is a difference between the previous component cross tabulation data file 56 and the current component cross tabulation data file 57, accumulated at a prescribed period such as every day, every week or every month.

On the other hand, the search server 20 consists of a computer system, and comprises the search program 21. The search program comprises a function to receive a search request from the director server 30 and to reply with the search result.

The search program 21, in addition, comprises a function to expand the component requirement history data file 59 converted into an XML file 60 in memory in the director server 30 as explained later, and to execute search processing that designates a particular component and period by a text search technique. The search program 21 comprises a function to set an appropriate threshold of the quantities in the fluctuation range of the required quantity of the component, and to automatically extract a component that has the required quantity fluctuation range exceeding the threshold (excess specifying logic) from the periodically recorded component requirement history data file 59.

The director server 30 consists of a computer system, and software such as an XML creation tool 31, a director 32, an application server 33, and a Web server 34 are implemented.

The XML creation tool 31 carries out processing to convert the component requirement history data file 59 obtained in the MRP server 10 into the XML file 60.

The director 32 executes the exchange of the XML file 60 with the search server 20, the management of search data, the management of the search server 20, and the reception/response of the search request from an application via the application server 33 and the Web server 34.

The application server 33 is server software comprising a function to receive a processing request from the search terminal 40 (a user of the production management system of the present embodiment) via the Web server 34, and to work as a bridge to the processing of the director 32.

The Web server 34, by programs such as the search terminal control program 35, performs processing to provide the search terminal 40 with the search services to be described later, and the processing includes processing of displaying an excess component search screen 90 on the search terminal 40, receiving search conditions and relaying them to the application server 33 end, and processing of responding with the search result obtained from the search server 20 to the search terminal 40 via the director 32 and the application server 33.

The search terminal 40 comprises a personal computer 41, a display 42, an input/output device 43, and other elements. By accessing the Web server 34 of the director server 30 with a program such as a Web browser implemented in the personal computer 41, search instructions of the component requirement history data file 59 converted into the XML file 60 are carried out and display of the search result on a display 42 and other operations are performed.

In the following description, an example of production management system operations of the present embodiments is set forth with reference to the flowcharts etc. of FIG. 3A, FIG. 3B and FIG. 3C.

As for overall flow of the present production management system, first, the requirement data file 53 and the transaction data file 51 are generated by the MRP program 70, the history information generation program 80 runs periodically, the current component cross tabulation data file 57 is generated from the requirement data file 53 and the transaction data file 51, the component requirement history data file 59 is generated from the previous component cross tabulation data file 56 and the current component cross tabulation data file 57, and the component requirement history data file 59 is handed over to the XML creation tool 31. The XML creation tool 31 converts the received component requirement history data file 59 into an XML file, and accumulates the file in the search server 20. The search terminal control program 35 displays information on the basis of the search instruction by a user from the search terminal 40, or notifies an administrator of the information by means such as e-mail when an excess component is detected by the excess component specifying logic that is set in advance.

Details of the above flow are explained below.

First, at the instruction from a user, the MRP program 70 receives as input information called the "apparatus plan" such as the manufacturing deadline of a specific product apparatus and the quantity of manufactured product for every manufacturing deadline (step 101). On the basis of the "apparatus plan" of the specific product appratus, information such as an apparatus name 52a, a subunit/component name 52b, a basic unit 52c, a component name 52d, and a basic unit 52e of the apparatus configuration file 52 is registered in advance, the requirement data file 53 (BOM) recording information on procurement of a component (sub-item 53a) specified by the component name 52d, date (required date 53d), and the quantity of product (required quantity 53c) is generated, and "component plan" on a component basis is prepared (step 102).

On the basis of the requirement data file 53, information such as, for example, quantity of stock/product in process/inventory on order that is not shown in the drawing is set aside, component procurement is implemented by calculating the shortage, and the implementation result is recorded as the sub-item 51a, the parent item 51b, the quantity 51c, the transaction content 51d, and the transaction date 51e in the transaction data file 51 (step 103).

Figure 3B:
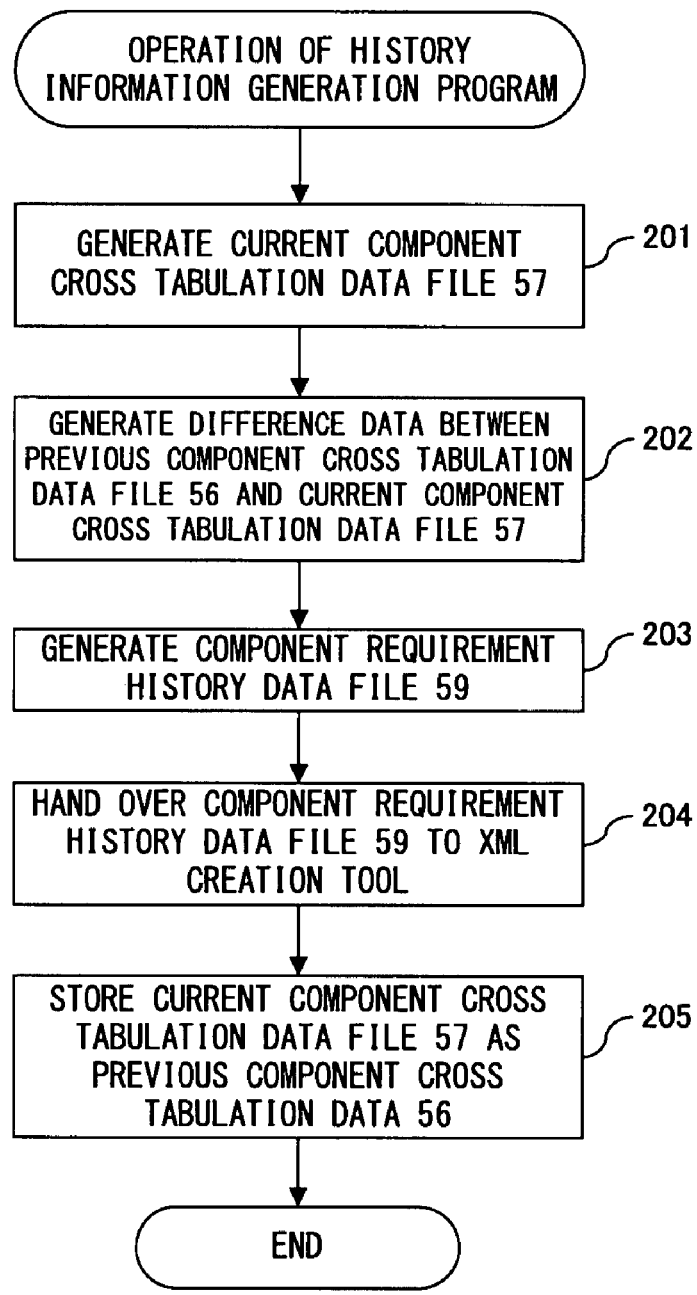
FIG. 3B is a flowchart showing an example of operations of the production management system that is one of embodiments of the present invention.
Figure 3C:
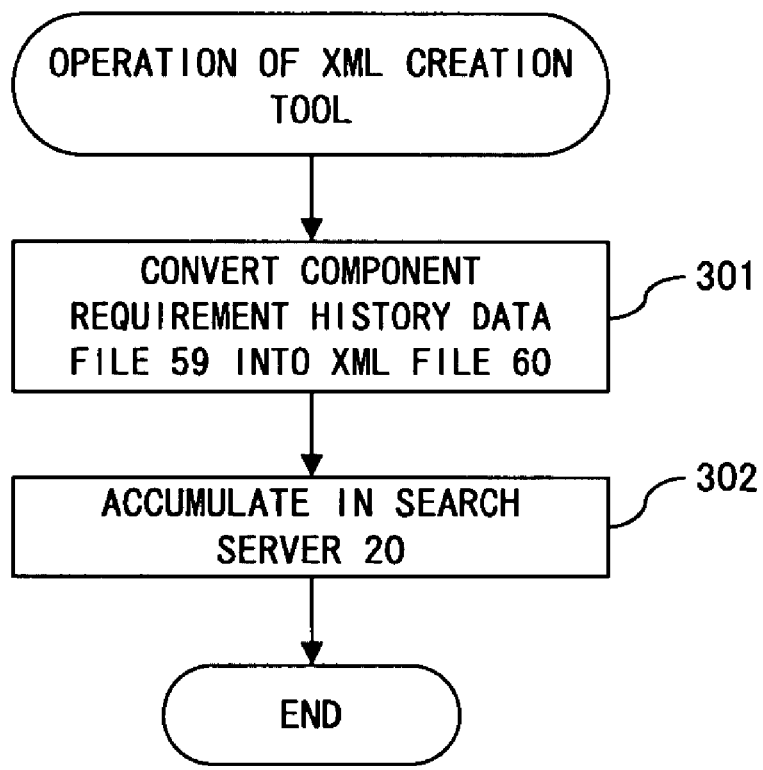
FIG. 3C is a flowchart showing an example of operations of the production management system that is one of embodiments of the present invention.

The history information generation program 80 performs data accumulation processing as shown in FIG. 3B, FIG. 5A and FIG. 5B. Specifically, for each month, for example, the sub-item 53a, the parent item 53b, the required quantity 53c and the requested date 53d of the requirement data file 53 are compared with the sub-item 51a, the parent item 51b, and the quantity 51c of the transaction data file 51, and cross tabulation is executed. The current component cross tabulation data file 57 including information of the sub-item 57a, the parent item 57b, the data creation date 57c and the required quantity in each period 57d is generated and stored (FIG. 5A) (step 201).

By comparing the previous component cross tabulation data file 56 generated in the previous cross tabulation processing with the current component cross tabulation data file 57 generated currently, the difference data of the required quantity of each component specified in the sub-item 57a (the required quantity in each period 57d) and that of the actual use record are calculated (step 202), and the result is recorded in the component requirement history data file 59 for each sub-item 59a by adding, in chronological order of, for example, the required quantity in each period 59d, the current component cross tabulation data and the difference data 59e generated in step 202 (FIG. 5B) (step 203). The generated component requirement history data file 59 is sent to the XML creation tool of the director server 30 (step 204), and the current component cross tabulation data file 57 is stored as the previous component cross tabulation data file 56 (step 205).

The XML creation tool 31 of the director server 30 converts the component requirement history data file 59 shown in FIG. 6A as an example into the XML file 60 shown in FIG. 6B as an example (step 301), and accumulates the file in the search server 20 (step 302).

Figure 4:
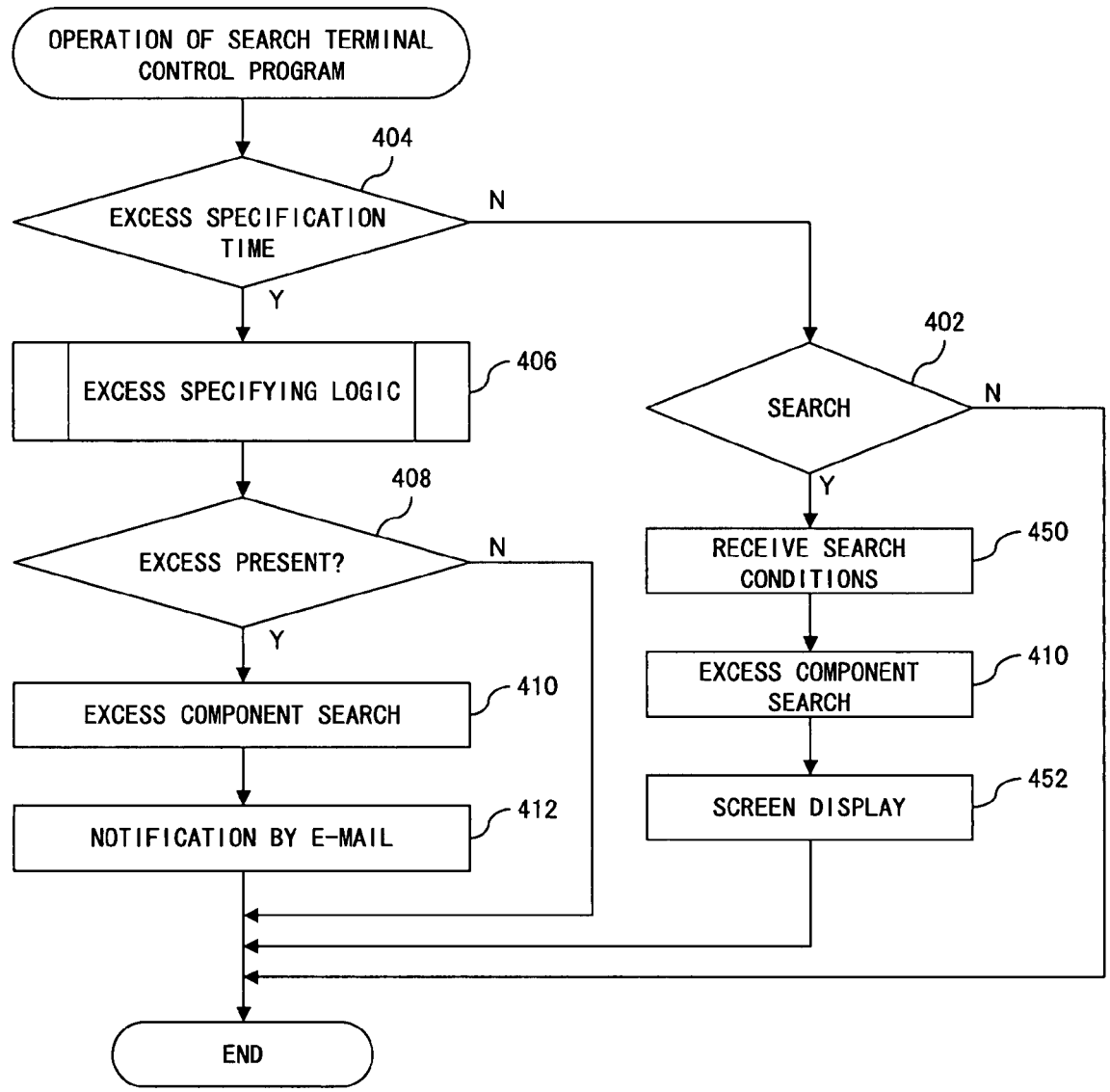
FIG. 4 is a flowchart showing an example of operations of the production management system that is one of embodiments of the present invention.

FIG. 4 shows a flow of the search terminal control program 35. Upon being triggered by a prescribed trigger (step 404), by the excess specifying logic (step 406), the presence or absence of component excess inventory is determined (step 408). For the excess specifying logic in step 406, the following rules (given as an example) may be set.

Rule 1: The components that exceed the needed quantity after setting aside a "component plan" within a previous specified period (e.g. n weeks, where n is a positive integer) are determined to be excess components.

Rule 2: Components for which the sum of the inventory estimation amount reaches a certain amount or more are determined to be excess components.

Rule 3: Compared with the previous "component plan", components of the top n items (n is a positive integer) with a large reduction are determined to be excess components.

It is possible that by separately using or combining each of these rules 1-3, the excess specifying logic can be established, and the excess components can be specified.

When there are excess components, by searching the component requirement history data file 59 (XML file 60) accumulated in step 200 with the sub-item 59a of the excess component as a key, a history check of the "component plan" of the component is performed (step 410).

A parent apparatus (parent item 59b) that is the cause of the excess in the quantity of the components (sub-item 59a) and its "component plan" (requirement data file 53) are specified, and an administrator registered in advance is notified of the result by e-mail (shown in FIG. 10 as an example); this is explained later (step 412).

Additionally, the search terminal control program 35 can execute the search by inputting the search conditions directly from the search terminal 40.

Figure 7:
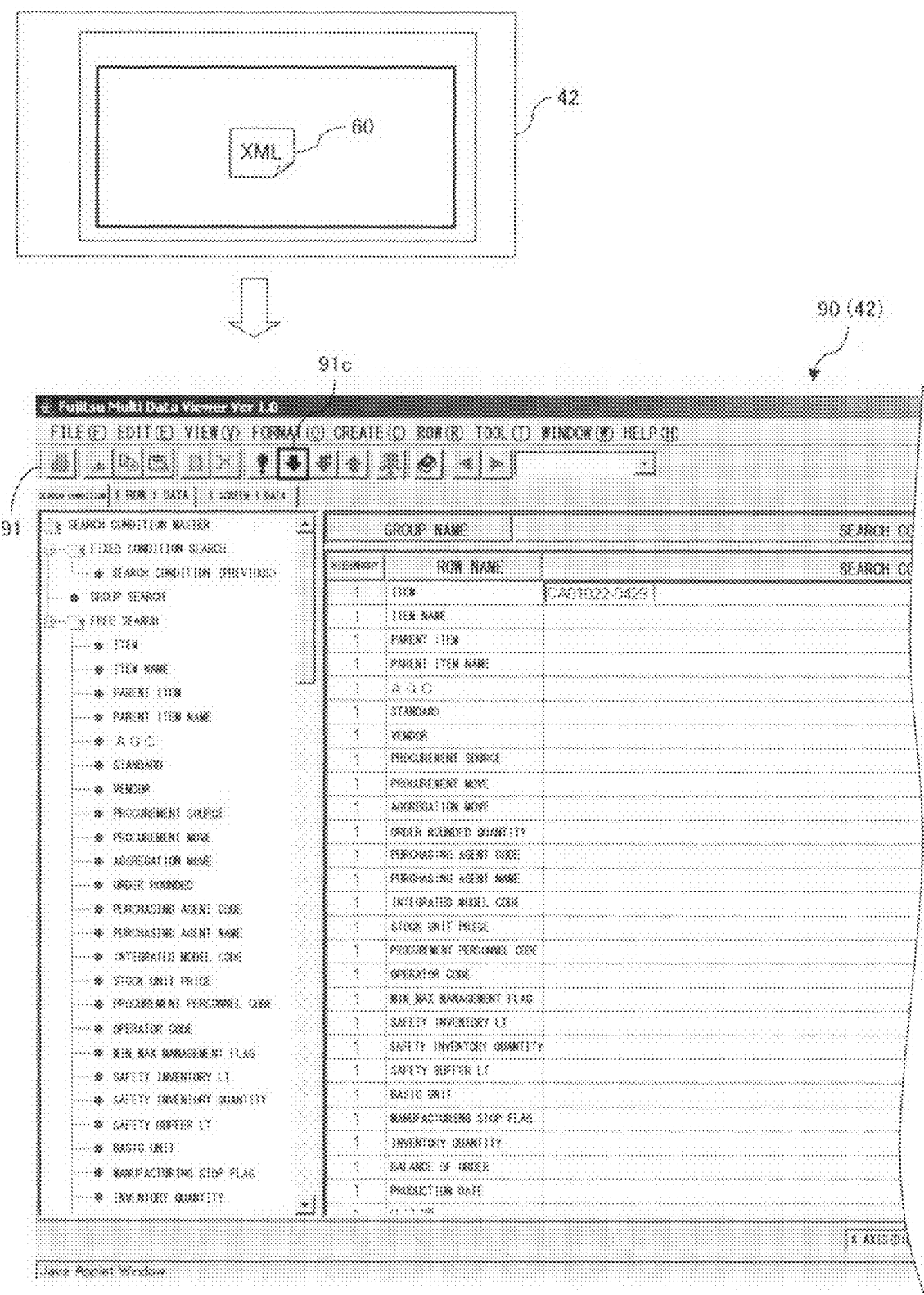
FIG. 7 is a diagram showing a conception of an example of a change in an excess component search screen of a search terminal in the production management system that is one of the embodiments of the present invention.

Specifically, if a search is needed (step 402), the sub-item 59a and search range (threshold) etc. that a user intends to search for are input from the excess component search screen 90 shown in FIG. 7, and the search is executed (step 450). The search terminal control program 35, then, searches for the component requirement history data file 59 (XML file 60) with the sub-item 59a of the excess components as a key. (step 410), and displays the applicable data (step 452). If the search range is defined by the search conditions, it is possible to highlight the applicable site (to enhance identifiability) by displaying using different colors, frames or shades.

Figure 8:
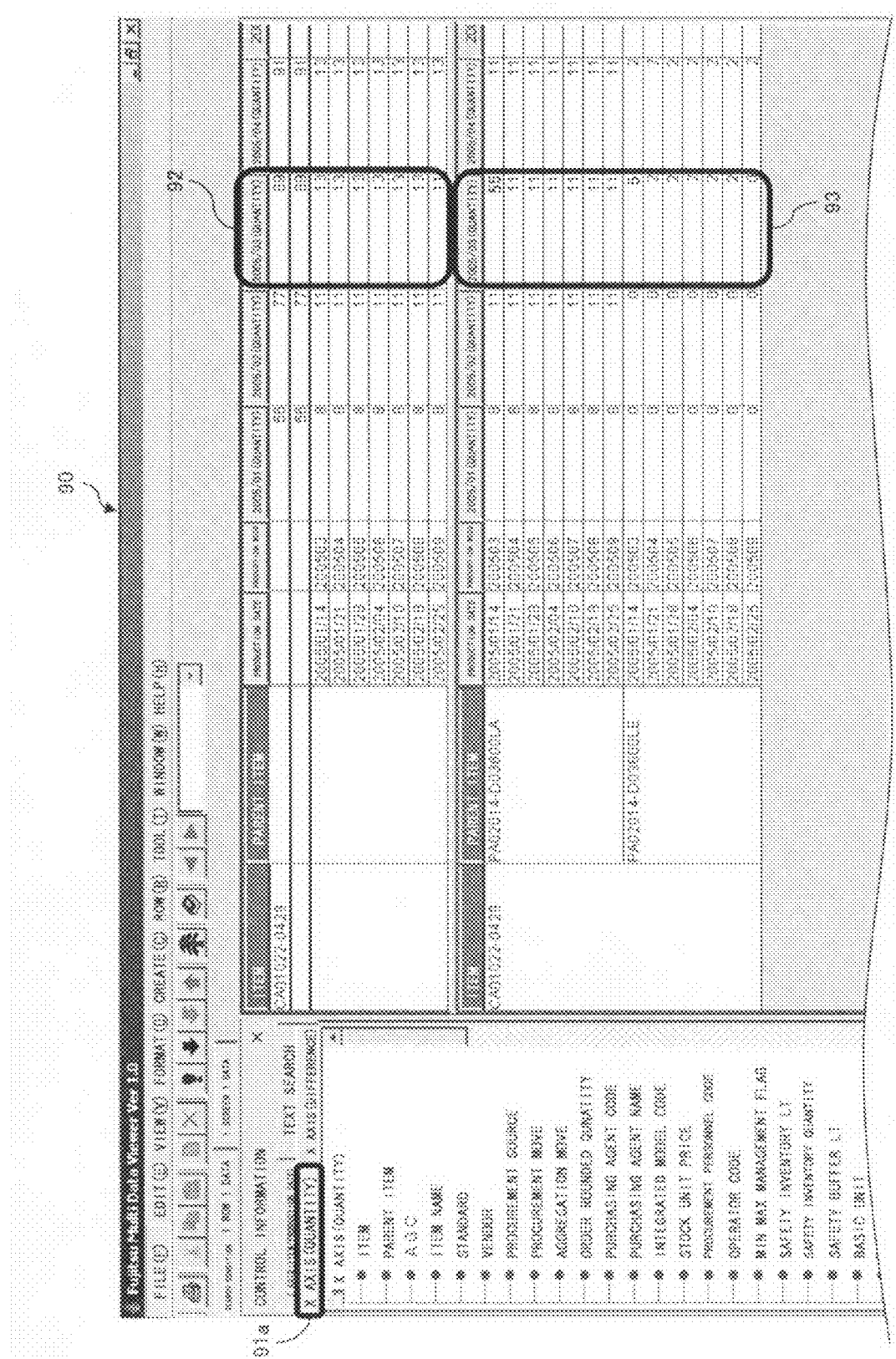
FIG. 8 is a diagram showing a conception of an example of a change in an excess component search screen of a search terminal in the production management system that is one of the embodiments of the present invention.
Figure 9:
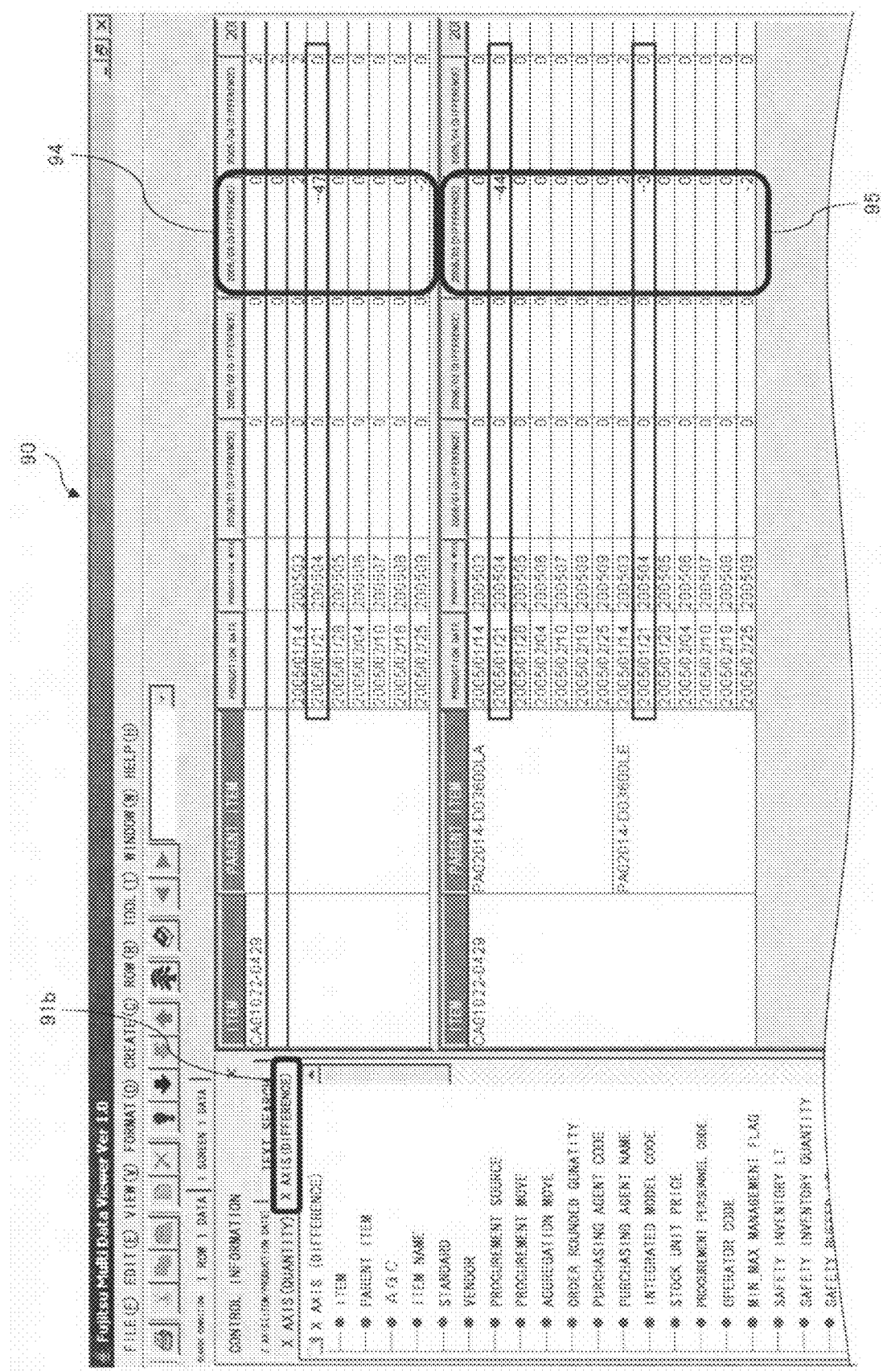
FIG. 9 is a diagram showing a conception of an example of a change in an excess component search screen of a search terminal in the production management system that is one of the embodiments of the present invention.

FIGS. 7, 8, and 9 are an example of a shift in the display screen of the display 42 showing tracing processes of the cause of the excess component (sub-item 59a) in the search terminal 40 operated by a user of the production management system of the present embodiment.

First, the excess component search screen 90 is displayed as shown in FIG. 7.

In the excess component search screen 90, the search condition is to be input to the right, and by inputting the search conditions such as the name of the component, time period, and threshold, and by further designating button 91c of a search command tab 91 on the top as a result acquisition button, the search of information that fits the conditions from the XML files 60 registered in the search server 20 is started. As a result of the search, as shown in FIG. 8, a display field of the required quantity for each item 92 that calculates and displays a required quantity for each component and a display field of the required quantity for each item/parent item 93 that display a required quantity for each item/parent item are output in the excess component search screen 90.

By a user of the production management system of the present embodiment designating a difference display button 91b of the search command tab 91, as shown in FIG. 9, a display field of the difference for each item 94 and a display field of the difference for each item/parent item 95 are displayed on the excess component search screen 90.

The display field of the difference for each item 94 is a field displaying a difference from the previous week calculated for each item.

The display field of the difference for each item/parent item 95 is a field displaying a difference from the previous week for each item/parent item.

The user can check the excess inventory by looking at these two screens.

It is also recognized that if the threshold of the reduction range from the previous week is set to be 40 in the search conditions, (−47) shown in the focused field 94 is found, and the sub-item 59a to be the excess inventory is a component "CA01022-0429" and the excess creation time (production date) is from 2005, Jan. 14 to Jan., 21.

By the user searching the display field of the difference for each item/parent item 95 on the basis of the sub-item 59a and the excess creation time, as shown in the focused field 95, a production cutback (−44) of the parent unit of the parent item "PA2014-D03600LA" is found, and at the same time, as shown in the focused field 95, a production cutback (−3) of another parent unit "PA02014-D03600LE" is recognized.

Note that in the example of FIG. 9, the identifiability of the user can be enhanced by displaying the rows that include focused information such as (−47), (−44) and (−3) in the above focused field 94 and focused field 95 in a frame.

When the display field of the requirement for each item/parent item 93 is considered on the basis of the information of the parent unit (parent item 59b) and the excess creation time (production date), as shown in the focused field 93, a production cutback (−44) from Jan., 14 to Jan., 21 of the parent unit "PA2014-D03600LA" is found, and similarly a production cutback (−3) from Jan., 14to Jan., 21 of the parent unit "PA02014-D03600LE" is found.

As described above, according to the present embodiment, if excess inventory is created in the components managed by a production management system such as MRP, a user of the production management system of the present embodiment, by designating the sub-item 59a of the component to the search terminal control program 35 and searching the component requirement history data file 59, can promptly and accurately identify the time point when the component is procured, the production apparatus plan in which the component is procured, and the time point and the cutback or disappearance of products apparatus that caused the excess inventory.

Figure 11:
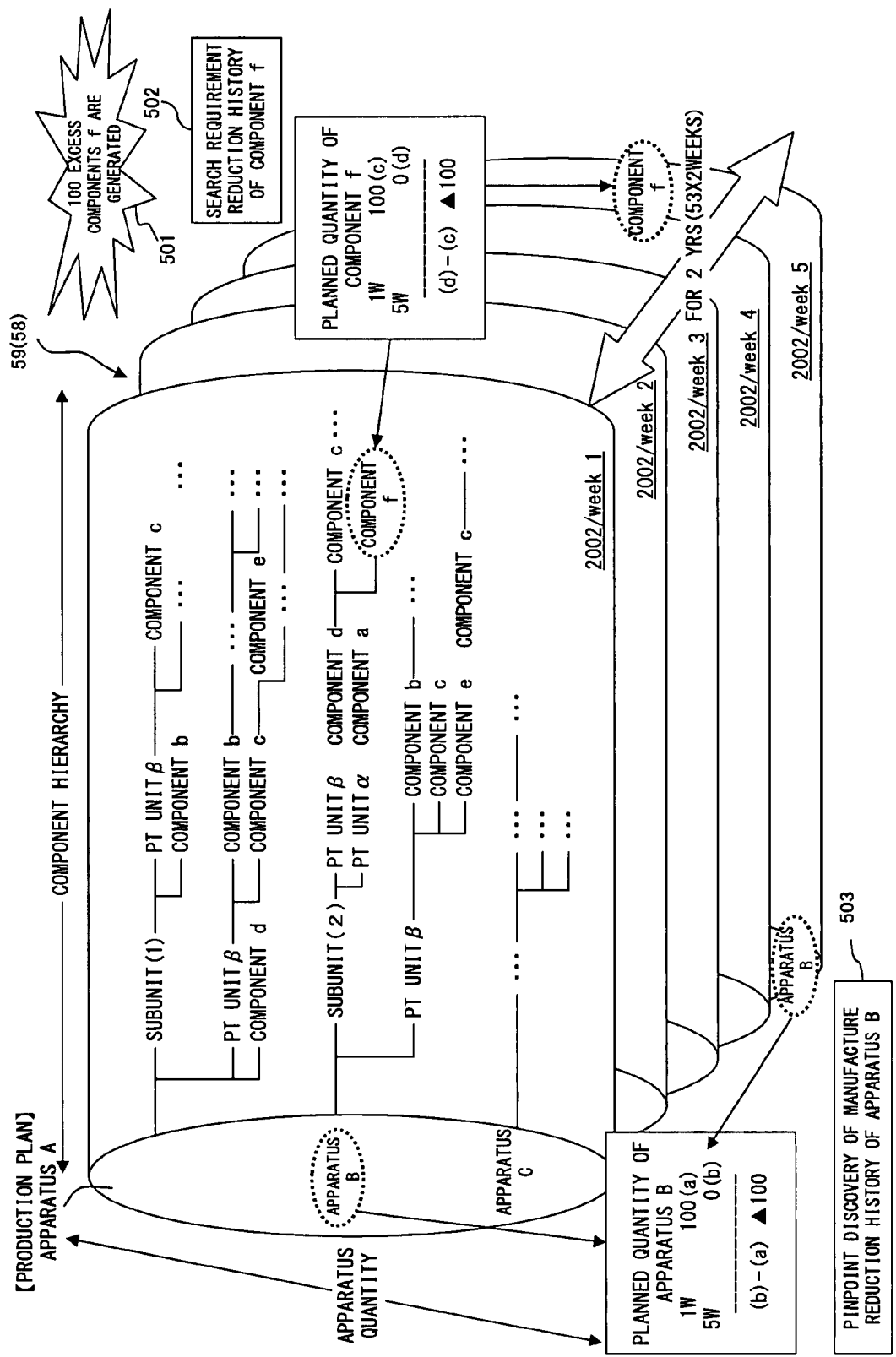
FIG. 11 is a diagram showing a conception of component requirement history data file accumulation process in the production management system that is one of the embodiments of the present invention.

As shown in FIG. 11, even in a case of many numbers of manufactured product apparatuses (e.g. a several thousand types), a case of many levels of the usage relation hierarchy between components (e.g. a maximum of 10 hierarchies), or a case of difficulty in specifying the cause of the excess components via conventional technology, according to the present embodiment, by accumulating every week (for example) the differences as the component requirement history data file 59 between the required quantity of components in accordance with the production plan and the actual use record by the history information generation program 80, it is possible to accurately specify the cause of the excess of the component.

Specifically, in the example of FIG. 11, if a surplus of 100 of "component f" is found (event 501), a cutback history of the component f is searched with reference to the component requirement history data file 59 and the apparatus requirement history data file 58 by the search terminal control program 35 (event 502), pinpoint retrieval of the cutback history of "apparatus B" that corresponds to the subtraction amount of 100 of the component f can be achieved (event 503).

As a result, the user of the production management system of the present embodiment can prepare the component excess inventory control promptly and appropriately. Detailed verification of weekly MRP and component procurement and early detection of component excess (waste) can be achieved and significant improvement in management efficiency and management accuracy of the production management system by the existing MRP can be expected.

In other words, it is possible to appropriately manage the history of the excess inventory of components constituting a product. It is also possible to appropriately realize control of the component excess inventory generated in the production planning system.

It should be noted that the present invention is not limited to the configuration shown in the above embodiment, but various changes and modifications can be made within the scope of the gist of the present invention.

According to the present invention, it is possible to appropriately manage the history of the excess inventory of components constituting a product.

It is also possible to promptly and appropriately realize control of the excess inventory generated in the production planning system.

What is claimed is:

1. A computer-readable recording medium recording a production management program that causes a computer to execute:
    a first process, based on a component table in which a group of components constituting a product is defined and on production planning information of the product, determining component planning information including a required period and a required quantity of each of the components;
    a second process linking, for each certain period, the component planning information relating to each of the components to an actual use record indicating time of use of the components and a quantity of the components, and recording the component planning information linked to the actual use record in chronological order as first history information;
    a third process calculating a difference between the current first history information and previous first history information and recording the calculated difference as second history information; and
    a fourth process converting the second history information into a markup language and recording the converted second history information, and searching and displaying the second history information on the basis of a specific component and period designated from outside.

2. The computer-readable recording medium according to claim 1, the production management program causing a computer to further execute the fourth process converting the second history information into a markup language and recording the converted the second history information, and extracting the specific component for which an inventory exceeded a certain threshold from the second history information, and displaying the specific component.

3. The computer-readable recording medium according to claim 2, wherein the fourth process causes a computer to further execute a display that allows only items that exceed the certain threshold to be identifiable.

4. A production management method comprising:
    a first process using a central processing unit so as to determine component planning information, on the basis of a component table in which a group of components constituting a product is defined and on the basis of production planning information of the product, the component planning information including a required period and a required quantity of each of the components;
    a second process using the central processing unit so as to link, for each certain period, the component planning information relating to each of the components to an actual use record indicating time of use of the components and a quantity of the components and so as to record the component planning information linked to the actual use record in chronological order as first history information;
    a third process using the central processing unit so as to calculate a difference between the current first history information and previous first history information and record the calculated difference as second history information; and
    a fourth process using the central processing unit so as to convert the second history information into a markup language and record the second history information, and so as to search and display the second history information on the basis of a specific component and period designated from outside.

5. The production management method according to claim 4, further comprising the fourth process converting the second history information into a markup language and recording the converted second history information, and extracting the specific component for which an inventory exceeded a certain threshold from the second history information, and displaying the specific component.

6. The production management method according to claim 5, wherein the fourth process further executes a display that allows only items that exceed the certain threshold to be identifiable.

7. A production management system having a control logic comprising:
    storing unit to store a component table in which a group of components constituting a product is defined and production planning information of the product;
    a first function to determine component planning information including a required period and a required quantity of each of the components on the basis of the component table and the production planning information;
    a second function to link, for each certain period, the component planning information relating to each of the components to an actual use record indicating time of use of the components and a quantity of the components, and to record the component planning information linked to the actual use record in chronological order as first history information in the storing unit;
    a third function to calculate a difference between the current first history information and previous first history information and to record the calculated difference as second history information in the storing unit; and
    a fourth function to convert the second history information into a markup language and record the converted second history information, and to search and display the second history information on the basis of a specific component and period designated from outside.

8. The production management system according to claim 7, wherein the control logic further comprises the fourth function to convert the second history information into a markup language and record the converted second history information, and extracting the specific component for which an inventory exceeded a certain threshold from the second history information, and displaying the specific component.

9. The production management system according to claim 8, wherein the fourth function further executes a display that allows only items that exceed the certain threshold to be identifiable.

* * * * *